United States Patent [19]

Richley

[11] Patent Number: 5,222,075
[45] Date of Patent: Jun. 22, 1993

[54] TRANSMITTED CODE CLOCK CODE-MATCHING SYNCHRONIZATION FOR SPREAD-SPECTRUM COMMUNICATION SYSTEMS

[75] Inventor: Edward A. Richley, Mountain View, Calif.

[73] Assignee: Xerox Corporation, Stamford, Conn.

[21] Appl. No.: 737,568

[22] Filed: Jul. 26, 1991

Related U.S. Application Data

[63] Continuation of Ser. No. 459,059, Dec. 29, 1989, abandoned.

[51] Int. Cl.[5] .................................. H04L 27/30
[52] U.S. Cl. .................................. 375/1; 380/34; 380/48; 375/120
[58] Field of Search ............... 380/34, 48, 49, 50; 370/18; 375/1, 110, 114, 115, 118–120

[56] References Cited

U.S. PATENT DOCUMENTS

| | | | |
|---|---|---|---|
| 3,641,433 | 2/1972 | Mifflin et al. | 375/1 |
| 4,567,588 | 1/1986 | Jerrim | 370/18 |
| 4,618,996 | 10/1986 | Rafel et al. | 455/46 |
| 4,653,076 | 3/1987 | Jerrim et al. | 375/115 |
| 4,953,178 | 8/1990 | Ishigaki | 375/1 |

OTHER PUBLICATIONS

R. C. Dixon, *Spread Spectrum Systems*, 2nd Edition, N.Y., Wiley, 1984, pp. 224–226 & 254–257.
A. Kesteloot, "A Practical Direct-Sequence Spread-Spectrum UHF Link," *QST*, May 1989, pp. 14–21.

*Primary Examiner*—Bernarr E. Gregory

[57] ABSTRACT

The transmitter for a direct-sequence spread-spectrum communication system encodes its code rate into the phase difference between a pair of identically modulated, sum and difference frequency carries which it transmits to the receiver. The receiver, in turn, mixes the two carriers with each other to recover a signal having a frequency representing their phase difference, thereby enabling the receiver to derive a synchronous code rate from the phase difference signal, directly or by means of a resettable oscillator which is driven by the phase difference signal. If desired, the sum and difference frequency carrier may have overlapping sidebands in the frequency domain.

10 Claims, 1 Drawing Sheet

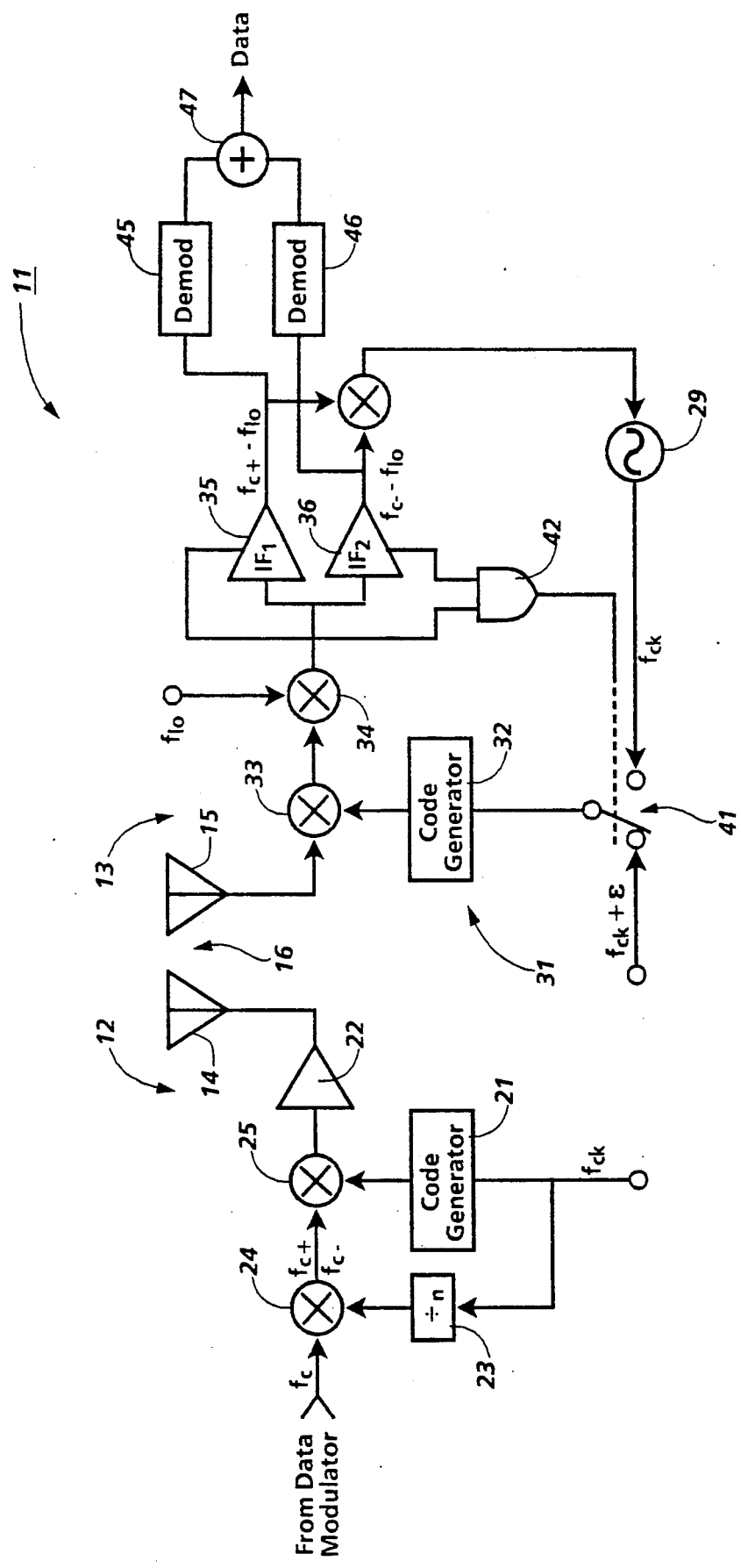

TRANSMITTED CODE CLOCK CODE-MATCHING SYNCHRONIZATION FOR SPREAD-SPECTRUM COMMUNICATION SYSTEMS

This is a continuation of application Ser. No. 07/459,059, filed Dec. 29, 1989, now abandoned.

FIELD OF THE INVENTION

This invention relates to spread-spectrum communication systems and, more particularly, to a relatively low power, code-matching synchronization technique for direct-sequences spread-spectrum communication systems.

BACKGROUND OF THE INVENTION

Spread-spectrum communication systems characteristically spread the spectrum of the signals they transmit over a bandwidth which greatly exceeds the information bandwidth of the signals, As a general rule, communication systems of this type are designed to distribute the transmitted signal energy more or less uniformly throughout a relatively broad band of frequencies, so relatively little of the transmitted signal energy resides within any given narrow frequency band.

Spread-spectrum communication systems offer several advantages over conventional narrow band systems. For example, spread-spectrum signals are relatively immune to interference from, and are less likely to cause interference to, narrow band ("nonspread") signals. Furthermore, some spread-spectrum systems are compatible with the use of code-division multiplexing for carrying out multiple communications independently at the same time and frequency. As is known, code-division multiplexing is a convenient alternative to time division and frequency division multiplexing for sharing the spectrum among multiple users. In view of these advantages, it is believed that spread-spectrum communications will become more commonplace, especially within the license-free bands (i.e., 902–928 MHz, 2400–2483.5 MHz, and 5725–5850 MHz) which have been allocated for transmissions of this type as transmitted power levels of up to 1 watt, subject to certain restrictions relating to the distribution of the sideband energy.

Several techniques have been developed for performing the signal spreading for spread-spectrum communications, including "frequency hopping" where the center frequency of a RF carrier is cyclically varied at a relatively high rate in accordance with a predetermined table of frequencies, and "direct-sequence" spreading where the phase of the RF carrier is rapidly varied in accordance with a pseudo-random binary sequence or "code."

In a direct-sequence spread-spectrum communication system, the transmitter conventionally mixes a pseudo-random code-like sequence with an information modulated carrier-signal, thereby distributing the signal energy throughout the available bandwidth. Any of a number of well known modulations techniques may e employed for impressing data or other information on the carrier. The phase modulation produced by the pseudo-random sequences causes the spectral density of the transmitted signal to be uniform to a first approximation across a wide band of frequencies.

Straightforward digital circuitry is available for generating such pseudo-random sequences. However, improved methods and means still are needed for "de-spreading" the spectrum spreaded signal at the receiver so that the carrier can be recovered from it. To carry out this de-spreading function, the spread-spectrum signal appearing at the input of the receiver must be mixed with a pseudo-random sequence which is identical in both frequency and phase to the signal spreading sequence employed at the transmitter. This process commonly is referred to as "synchronization."

Several synchronization techniques have been developed for direct-sequence spread-spectrum communications. See, for example, R. C. Dixon, *Spread-Spectrum Systems*, 2 Ed., Chapter 6, John C. Wiley & Sons, 1984. Some of the approaches that have been proposed are very complicated, or rely on special spreading codes for enhancing synchronization. For instance, there are proposals which require the receiver to have multiple correlators operating in parallel in order to find the proper code phase for de-spreading the received signal. Thus, in the interest of simplifying this disclosure, the following discussion concentrates on the known synchronization techniques which are believed to be most relevant to this invention.

One of the simpler of the available synchronization techniques is referred to as the "transmitted reference" method. This type of synchronization often is carried out by employing the same pseudo-random sequence for spreading the spectra of two carriers. The same information is impressed on both of these carriers, but the carrier center frequencies are sufficiently widely separated that there is no significant overlap between their sidebands in the frequency domain. Therefore, a carrier can be recovered at the receiver by mixing the outputs of a pair of tuned amplifiers, each of which is tuned to the spread-spectrum of a respective one of the transmitted carriers. The frequency of the carrier which is recovered by the mixer is equal to the difference between the frequencies of the transmitted carriers, so the information content of the transmitted carriers is preserved because it is a "common mode" signal (i.e., common to both of the carriers). As will be appreciated, the receiver does not require any dedicated synchronization circuitry to carry out this synchronization process. However, that advantage is offset by significant disadvantages, including the susceptibility of the receiver to interference from other transmitters, and the lack of knowledge at the receiver of the transmitted code. Such knowledge is, of course, necessary if it is desired to employ code-division multiplexing.

There also are prior so-called "carrier lock tracking" synchronization techniques for direct-sequences spread-spectrum communication systems. To carry out this type of synchronization, the carrier is synchronized with the code clock at the transmitter, and a sliding correlator is employed within the receiver to search for the proper code phase. The sliding correlator characteristically comprises a pseudo-random code generator for driving a mixer to which the incoming spread-spectrum signal is applied. This code generator is matched to the transmitter code generator, so that it can substantially replicate the transmitted code sequence when it is operating in phase synchronism with the transmitter code generator. When, however, the receiver is operating in an idle or standby mode, its code generator is driven by a local clock source at a frequency which is offset slightly from the clock rate at which the transmitter code generator is driven, whereby the relative phase of their respective code sequences varies sufficiently slowly that correlation can be detected, typically in the time it takes for their relative phase to slip by one bit. Once correlation is detected, the receiver code clock switches over to the transmitted code rate, either by switching the receiver code generator so that it is clocked by a separate local clock which is preset to the same frequency as the transmitter code clock or by phase locking the receiver code clock to the carrier. Thus, in these known carrier lock tracking-type synchronizers, the sliding correlator is used to find lock, and carrier detection then is employed to maintain lock. If the spectrum spreading code sequence is of moderate length, lock can be obtained in a reasonable amount of time. The receiver essentially replicates the transmitted code sequence when it is locked to the transmitter, so code-division multiplexing can be employed for carrying out simultaneous communications between several different transmitter/receiver combinations over the same band of frequencies.

Known carrier lock synchronization techniques customarily tie the code clock frequency (i.e., the "code rate") to the carrier frequency, thereby restricting the designer's freedom of choice with respect to one or the other of those frequencies. As a general rule, the carrier frequency is significantly higher than the code rate, so a frequency divider typically is employed in the receiver for deriving the code rate from the carrier, even though this may create a phase ambiguity which then has to be resolved by the correlator. For example, if the carrier frequency is n times higher than the code rate (where n is an integer greater than one), n phases of the carrier will produce code phases within a one-bit wide correlation window, so the correlator then typically is required to determined which code phase provides the strongest carrier output for the best signal to noise ratio.

Others have attempted to reduce this code-phase ambiguity by augmenting the receiver with a local oscillator which is driven by a frequency multiplier at a frequency which is derived from the local code clock. In these systems, a mixer mixes the spread-spectrum signal that is received by the receiver with the frequency generated by the local oscillator, such that the carrier frequency is shifted to $(n-m) f_c$, where $f_c$ is the carrier frequency of the transmitter, and m is the integer factor by which the frequency multiplier multiples the receiver code clock frequency. Consequently, if $(n-m)$ is selected to equal one, the frequency of the de-spread carrier is equal to the code clock rate or frequency, $f_{ck}$. Even then, however, there still may be an ambiguity caused by having two code phases within the one-bit wide correlation window because the relative phase of the transmitter and receiver code clocks is unknown and not easily predictable. See, Dixon, supra, at pp. 254–257.

Power consumption is another important consideration, especially for spread-spectrum communications between portable, battery powered stations, such as computers. In these applications, the receiver is likely to be powered-up continuously, so the amount of power it draws can be critical. Unfortunately, the frequency dividers employed in prior carrier lock tracking synchronization schemes tend to draw a substantial amount of power, especially when the communications are being carried out at very high frequencies, such as within one of the aforementioned license-free bands. At the current state of the art, emitter coupler logic (ECL) typically is required for frequency dividers operating at such high frequencies, but logic of that type is ill-suited for applications requiring power conservation. Furthermore, high signal levels for driving ECL dividers, so the amplifiers that are needed to provide such signal levels consume additional power. Therefore, there is a need for an economical and easily implemented lower power, code-division multiplexing compatible, synchronization technique for spread-spectrum communications.

SUMMARY OF THE INVENTION

To satisfy that need, in accordance with the present invention, the transmitter for a direct-sequence spread-spectrum communication system encodes its code rate into the phase difference between a pair of identically modulated carriers which it transmits to the receiver. The receiver, in turn, mixes the two carriers with each other to recover a signal having a frequency representing their phase difference, thereby enabling the receiver to derive a synchronous code rate from the phase difference signal, directly or by means of a resettable oscillator which is driven by the phase difference signal.

BRIEF DESCRIPTION OF THE DRAWINGS

Additional features and advantages of this invention will become apparent when the following detailed description is read in conjunction with the attached drawing, in which The FIGURE illustrates a direct-sequence spread-spectrum communication system which embodies a transmitted reference, code-matching synchronizer constructed in accordance with the present invention.

DETAILED DESCRIPTION OF THE ILLUSTRATED EMBODIMENT

While the invention is described in some detail hereinbelow with specific reference to an illustrated embodiment, it is to be understood that there is no intent to limit to that embodiment. On the contrary, the aim is to cover all modifications, alternatives and equivalents falling within the spirit and scope of the invention as defined by the appended claims.

Turning now to the FIGURE, it will be seen that there is a direct-sequence spread-spectrum communication system 11 comprising a transmitter 12 and a receiver 13 which have attennae 14 and 15, respectively, for communication over a radio link 16. In accordance with the present invention, the transmitter 12 encodes the phase of the clock, $f_{ck}$, for its code generator 21 into the phase difference between two carriers, $f_{c+}$, and $f_{c-}$, modulates the signal composed of those two carriers in accordance with a pseudo-random code-like sequence to spread its spectrum, and then amplifies the spread-spectrum signal in a power amplifier 22 to bring it up to a suitable level for radiation from the antenna 14. Unlike a transmitted reference-type synchronization system, the sidebands of these two code-modulated carriers may overlap in the frequency domain.

The carriers $f_{c+}$ and $f_{3-}$ conveniently are produced by mixing the information modulated carrier, $f_c$, that is generated within the transmitter 12 (by means not shown) with a frequency which is derived from the transmitted code clock, $f_{ck}$, by a frequency divider 23. To that end, as shown, the frequency of the code clock $f_{ck}$, is divided in the frequency divider 23 by a selected integer n, and the output of the divider 23 then it fed to a double balanced mixer 24 where it is mixed with the information modulated carrier, $f_c$. The mixer 24, therefore, splits the carrier, $f_c$, into sum and difference carrier components, $f_{c+}$ and $f_{c-}$, respectively, where $f_{c+} = f_c + f_{ck}/n$ and $f_{c-} = f_c - f_{ck}/n$. The signal containing these two carrier components, $f_{c+}$ and $f_{c-}$, then is applied to another double balanced mixer 25 where it is mixed with the code sequence generated by the code generator 21, thereby spreading its spectrum.

Focusing for a moment on the phase difference between the carrier components $f_{c+}$ and $f_{c-}$, it will be evident that its frequency is given by $(f_{c+}) - (f_{c-}) = 2f_{ck}/n$. Furthermore, their relative phase is directly related to the phase of the transmitter code clock because, for any integer value of $n \geq 2$, every zero crossing of their phase difference, $f_{c+} - f_{c-}$, corresponds to a zero crossing of the transmitter code cock, $f_{ck}$. This means that the transmitter code clock, $f_{ck}$, can be recovered at the receiver 13 by recovering the phase difference between the carriers $f_{c+} - f_{c-}$.

With that in mind, it will be seen that the receiver 13 has a generally conventional sliding correlator 31. More particularly, as shown, the correlator 31 includes a pseudo-random code generator 32 which is matched to the transmitter code generator 21 (i.e., the code generator 32 essentially replicates the pseudo-random sequence generated by the code generator 21 when it is operating in phase synchronism therewith), together with a double balanced mixer 33 for mixing the code sequenced generated by the code generator 32 with the spread-spectrum signal picked-up by the receiver antenna 15.

While the receiver 13 is operating in its idle or standby mode, its code generator 32 is clocked by a local clock, $f_{ck} + \epsilon$, at a frequency which is slightly offset from the frequency of the transmitter code clock, $f_{ck}$. The frequency difference between these two clocks preferably is selected so that the relative phase of the transmitter and receiver code generators 21 and 32 changes sufficiently slowly that correlation can be detected in the time it takes for their relative phase to slip by one bit.

Whenever the phase of the code supplied by the code generator 32 correlates with the code modulation of the carriers $f_{c+}$ and $f_{c-}$, the composite spectrum of those two carriers is de-spread by the mixer 33. Typically, the carrier frequencies $f_{c+}$ and $f_{c-}$, are so high that significant power would be consumed if they were processed directly to recover their relative phase difference. Moreover, the frequency difference between them generally is only a small percentage of the frequency of either of them, so it would be difficult to separate them by straightforward filtering. For those reasons, the de-spread signal is shifted to a lower frequency by mixing it in another mixer 34 with a suitable frequency shifting signal, $f_{lo}$, such that the difference signal supplied by the mixer 34 is a signal containing the frequency shifted carriers, $f_{c+} - f_{lo}$ and $f_{c-} - f_{lo}$. The frequency of the phase difference between these lower frequency carriers is $(f_{c+} - f_{lo}) - (f_{c-} - f_{lo}) = 2f_{ck}/n$, so the frequency and phase encoding of the transmitter code clock, $f_{ck}$, is unaffected by the frequency shift.

To recover the transmitter code clock, $f_{ck}$, from the de-spread signal, the output of the mixer 34 is applied to the parallel inputs of a pair of IF amplifiers 35 and 36, one of which is tuned to the frequency of the carrier $f_{c+} - f_{lo}$ and the other of which is tuned to the frequency of the carrier $f_{c-} - f_{lo}$. As will be appreciated, virtually the same arrangement could be employed if it was desired to process the carriers $f_{c+}$ and $f_{c-}$ directly, without downshifting their frequencies, except that the mixer 34 could be eliminated and the amplifiers 35 and 36 would be tuned to the carriers $f_{c+}$ and $f_{c-}$, respectively. The amplifiers 35 and 36 filter the signals that is applied to them to separate the carriers $f_{c+} - f_{lo}$ and $f_{c-} - f_{lo}$ (or, $f_{c+}$ and $f_{c-}$) from each other, and then apply the filtered carriers to still another mixer 38.

Consequently, the difference signal supplied by the mixer 38 is the phase difference signal, $f_{c+} - f_{c-}$ which, as previously noted, has a frequency of $2f_{ck}/n$.

If $n=2$, the phase and frequency of this phase difference signal supplied by the mixer 38 is appropriate for clocking the receiver code generator 32 in phase synchronism with the code modulation of the spread-spectrum signal received by the receiver 13. If, on the other hand, $n > 2$, the phase difference signal suitably is employed for driving a local asynchronous oscillator 39 to cause it to generate a clock signal, $f_{ck}$, for clocking the receiver code generator 32 in phase synchronism with the spectrum spreading code of the spread-spectrum signal received by the receiver 13. In either case, the code phase at which correlation occurs is unambiguously determined because the frequency of the phase difference signal $f_{c+} - f_c$, is less than the frequency of the code clock, $f_{ck}$, for all values $n \geq 2$, which means that every zero crossing of the phase difference signal, $f_{c+} - f_c$, corresponds to a zero crossing of the code clock, $f_{ck}$. Advantageously, the oscillator 39 is resettable, so that its phase is corrected on the leading and trailing edges of the phase difference signal, $f_{c+} - f_c$, thereby correcting the phase of the code clock, $f_{ck}$, it generates every $n/2$ cycles.

A switch, generally indicated at 41, is provided for switching the clock input of the receiver code generator 32 form the local code clock, $f_{ck} + \epsilon$, to the recovered code clock, $f_{ck}$, whenever the de-spread carriers $f_{c+}$ and $f_{c-}$ are detected at the receiver 13. This carrier detection function can be performed in a variety of different ways by monitoring the signal appearing at the output of the mixer 32 to determine whether the signal strength of the carriers $f_{c+}$ and $f_{c-}$ exceeds a predetermined threshold level or not. For example, the IF amplifiers 35 and 36 may have built-in scanner stop or squelch circuits, such as are found in modern IF amplifiers for radios and the like, which can be employed as carrier detectors. In that event, the carrier detect outputs of the amplifiers 35 and 36 suitably are applied to respective inputs of an AND gate 42 for toggling the switch 41, thereby causing it to apply the recovered code clock, $f_{ck}$, or the local clock, $f_{ck} + \epsilon$, to the receiver code generator 32 in the presence and absence, respectively, of the de-spread carriers $f_{c+}$ and $f_{c-}$.

The integrity of the information that is being transmitted is unaffected by the use of the two carriers $f_{c+}$ and $f_{c-}$ because they both experience the same phase change for data (i.e., the data is a common mode signal). As a result, the phase difference between the carriers $f_{c+}$ and $f_{c-}$ is unaffected by the data, even if it is impressed on them by phase shift keying or the like. Any noise which is not common to both of the carriers $f_{c+}$ and $f_{c-}$ will sum incoherently at the outputs of the amplifiers 35 and 36, while their common mode data will sum coherently, thereby increasing the signal-to-noise ratio of the phase difference signal, $f_{c+} - f_{c-}$. As will be appreciated, the outputs of the IF amplifiers 35 and 36 may be demodulated as a 45 and 46 and then summed by a summer 47 to recover the data.

Conclusion

In view of the foregoing, it now will be evident that the present invention provides economical and readily implemented methods and means for synchronizing low power receivers with transmitters of direct-sequence spread-spectrum communication systems, including systems which employ code-division multiplexing for sharing the available spectrum among multiple users. Moreover, it will be appreciated that this synchronization technique enables the designer to exercise substantial discretion in selecting the carrier frequency and the code rate because they are independent of each other. Furthermore, it will be seen that this invention enables the receiver to identify the transmitted code clock phase unambiguously, with the result that a relatively simple sliding correlator can be employed to find lock. It also will be apparent that once the correlator finds lock, the lock is unaffected by the data modulation of the carrier and tends to be preserved until the transmitted reference signal is interrupted. Still further, it will be evident that this invention allows the processing of the de-spread signal within the receiver to be performed at low frequency where components are less costly and consume less power than at higher frequencies.

What is claimed:

1. A method for synchronizing a transmitter and a receiver of a direct-sequence spread-spectrum communication system wherein matching pseudo-random code sequences are employed at the transmitter and receiver for spectrum spreading and spectrum de-spreading, respectively; said method comprising the steps of
   transmitting a spread-spectrum composed of two carriers having a relative phase difference which is proportional to a preselected code rate for the spectrum spreading code sequence,
   recovering, at said receiver, a de-spread signal having a frequency determined by the relative phase difference of said carriers, and
   deriving a clock signal from said phase difference signal at said receiver for synchronizing said spectrum de-spreading code sequence with said spectrum spreading code sequence.

2. The method of claim 1 wherein
   said carriers have frequencies selected to cause said phase difference signal to have a frequency which is equal to said preselected code rate, and
   said phase difference signal is said clock signal.

3. The method of claim 1 wherein
   said carriers have frequencies selected to cause said phase difference signal to have a frequency which is an integer submultiple of said preselected code rate.

4. A spread-spectrum communication system having a transmitter for transmitting a spread-spectrum signal, and a receiver for recovering data carried by said spread-spectrum signal; said system being characterized by:
   said transmitter including
      data source means for supplying a data modulated carrier signal,
      a first pseudo-random code generator means for generating a pseudo-random code sequence at a preselected code rate,
      reference signal source means for supplying a reference signal at a frequency that is a predetermined integer submultiple of said code rate,
      a first mixer means coupled to said data source means and to said reference signal source means for producing a composite signal containing said carrier in sum and difference frequency components that have a phase relationship that cyclically varies at approximately twice said submultiple of said code rate, and
      means coupled to said first mixer means and to said first code generator means for modulating said composite signal in accordance with said pseudo-random sequence to produce said spread-spectrum signal;
   said receiver including
      a second pseudo-random code generator means for generating a substantial replica of said pseudo-random code sequence at a controlled rate.
      a second mixer means having one input coupled to receive said spread-spectrum signal and another input coupled to said second code generator means for de-spreading said spread spectrum signal, whereby said composite signal is recovered when said replica of said pseudo-random code sequence is phase aligned with the pseudo-random modulation in the spread-spectrum signal,
      filtering means coupled to said second mixer means for extracting said sum and difference frequency components from the de-spread spread-spectrum signal,
      phase sensitive means coupled to said filtering means for producing a phase difference signal that cyclically varies in substantial accordance with the phase relationship of said sum and difference frequency components, and
      control means coupled to said filtering means, said phase sensitive means, and said second code generating means for selectively clocking said second code generator means at a local clock rate and at said preselected rate when the sum and difference frequency components extracted by said filtering means are below and above, respectively, a predetermined threshold level; and
      said local clock rate differing from said preselected rate, whereby the rate at which said code sequence is generated is controlled to first phase align and then synchronize said transmitter with said receiver.

5. The spread-spectrum communication system of claim 4 wherein
   said reference signal has a frequency that is approximately one half said preselected rate, whereby said phase difference signal has a frequency approximately equal to said preselected rate.

6. The spread-spectrum communication system of claim 4 wherein
   said reference signal has a frequency that is significantly less than one half said preselected rate, whereby said phase difference signal has a frequency proportional to said preselected rate, and
   said control means includes an oscillator that is driven by said phase difference signal for generating a synchronizing clock signal at a frequency that is approximately equal to said preselected rate.

7. The spread-spectrum communication system of claim 6 wherein
   said oscillator is an asynchronous oscillator that is reset on leading and trailing edges of said phase difference signal, thereby phase correcting said synchronizing clock signal on every zero-crossing of said phase difference signal.

8. The spread-spectrum communication system of claim 4 wherein
said control means includes a local oscillator that operates at said local clock rate and at said preselected rate when the sum and difference frequency components of the de-spread spread-spectrum signal are below and above, respectively, said threshold level.

9. The spread-spectrum communication system of any one of claims 4 or 5–8 wherein said filtering means separates said sum frequency component from said difference frequency component, and
said phase sensitive means includes means for mixing said sum frequency component with said difference frequency component to produce said phase difference signal.

10. The spread-spectrum communication system of claim 9 wherein said receiver further includes
frequency shifting means for shifting said composite signal to a lower frequency prior to filtering it, whereby said sum frequency component and said difference frequency component are shifted to lower frequencies prior to being separated from each other.

* * * * *